A. D. SKINNER.
STEAM HEATED PISTON.
APPLICATION FILED DEC. 4, 1917. RENEWED JUNE 7, 1919.

1,339,629.

Patented May 11, 1920.

A. D. Skinner
Inventor

Attorney

UNITED STATES PATENT OFFICE.

ALLAN D. SKINNER, OF ERIE, PENNSYLVANIA.

STEAM-HEATED PISTON.

1,339,629.　　　　　Specification of Letters Patent.　　Patented May 11, 1920.

Application filed December 4, 1917, Serial No. 205,414. Renewed June 7, 1919. Serial No. 302,633.

*To all whom it may concern:*

Be it known that I, ALLAN D. SKINNER, a citizen of the United States, residing at Erie, in the county of Erie and State of Pennsylvania, have invented certain new and useful Improvements in Steam-Heated Pistons, of which the following is a specification.

This invention relates to means for heating the pistons of steam engines, and it is particularly applicable to steam engines of the uniflow type, although it is not limited to engines of that type.

However it is illustrated in connection with such an engine, and in the accompanying drawings,—

Referring specifically to the drawings, A is the cylinder of a uniflow engine and B the hollow cylinder head having a steam chamber C in communication with the inlet valve D through which steam is admitted into the cylinder. This chamber C also communicates with a steam conducting tube E which is bolted or otherwise attached to the inner wall of the cylinder head and extends inwardly at the axis of the cylinder. At the inner end of this tube is a one way valve F, which may be either of the flap type or any other check type. This valve opens outwardly from the tube, and it might be located at any place within said tube.

G is a hollow piston connected to the piston rod H. This rod extends through the piston and is preferably bored at its inner end to telescope over the tube E; and it is extended inwardly beyond the piston so that it always laps said tube. If desired, the tube E could be made longer and the hollow part of the piston rod shorter, but if this were done the piston rod would have to be hollow beyond the other end of the piston, so that the tube E would not strike the piston rod when in the position shown in Fig. 2. The construction shown, therefore, is the preferable one.

Figure 1:
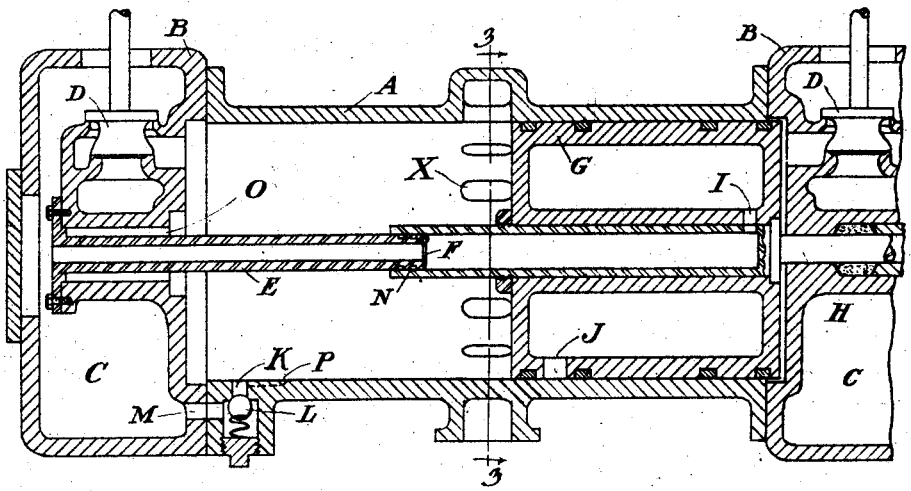
Figure 1 is a longitudinal section of a cylinder and piston showing the invention, the piston being at one end of its stroke.
Figure 2:
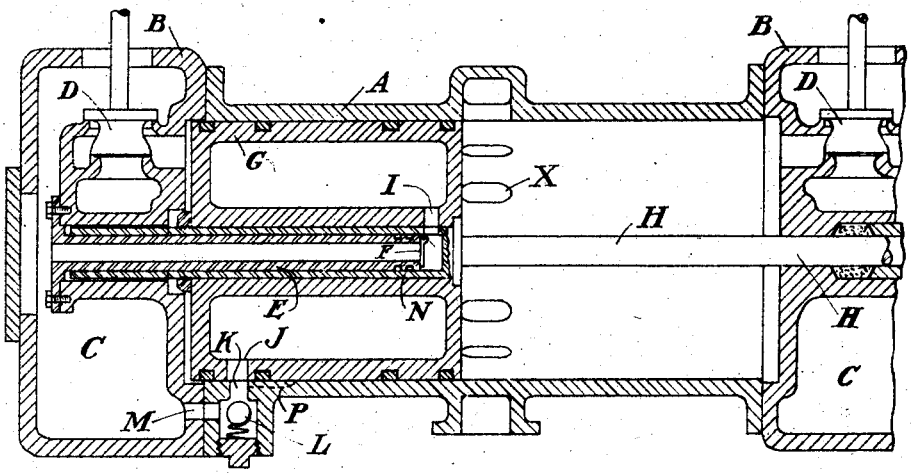
Fig. 2 is a similar view with the piston at the opposite end.
Figure 3:
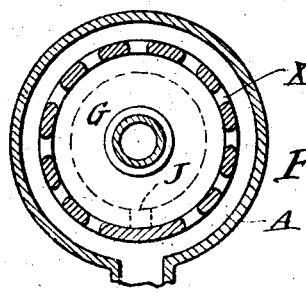
Fig. 3 is a cross section on the line 3—3 of Fig. 1.

I is an inlet port to the piston, communicating with the hollow part of the piston rod H, and J is an outlet port in the circumferential wall which registers with an outlet port K in the cylinder wall preferably at the end of stroke in one direction, as shown in Fig. 2. The port K is provided with a ball or other check valve L which opens outwardly to admit steam through the port M into the steam chamber C in the cylinder head. N are packing rings between the extension of the hollow piston rod and the tube E, and O is a counterbore in the inner wall of the cylinder head, around the tube E, to admit the extension of the piston rod.

The operation is as follows: When the piston moves from left to right in the drawings a reduction of pressure in the piston results and the check valve F opens under the excess pressure of the steam in the tube E and fills the hollow part of the piston rod H with steam. On the return stroke, the check valve F closes owing to the telescoping action between the piston rod and the tube, and creates a pressure in the hollow piston rod which discharges steam through the port I into the interior of the piston. When the piston reaches approximately the end of its stroke toward the left, the port J registers with the port K, and inasmuch as the pressure of the compressed steam in the piston is greater than that of the initial steam, the check valve L opens and steam flows through the port M into steam space C where it can be used for performing work by admission through the inlet valve D, which at that time is about to open. The tension of the spring behind the valve L will be only sufficient to support its weight and hold it up to its seat, consequently it will open under slight excess pressure.

In this construction steam is admitted to the piston only during the stroke in one direction, and it is also exhausted into the steam space C only at the stroke in the other direction. A notch P may be cut in the cylinder wall, leading to the port K, if it should be desired to exhaust the steam from the interior of the piston sooner than it otherwise would with the port K only, and such a notch would also have the effect of decreasing the compression in the piston, and the valve L also serves to relieve excessive compression in the cylinder on the return stroke. By this construction the interior of the piston at all times contains steam at not lower than boiler pressure and temperature, and about one half the time contains steam at higher than boiler pressure and temperature, which tends to counteract the cooling effect of the piston crossing the main exhaust ports X and the cooler cylinder walls adjacent thereto.

By so heating the piston, togther with the cylinder walls over which it travels, condensation in the cylinder is prevented or minimized, and the return of the compressed steam to the supply side avoids any loss of heat or pressure. The pumping action resulting from the reciprocation of the piston is very effective in producing a forced circulation of hot steam through the piston.

The invention is not limited to the particular construction as shown, but various changes may be made within the scope thereof.

I claim:

1. The combination of a steam engine cylinder having a tube projecting inwardly from the head thereof and connecting with a steam supply chamber, a hollow piston in the cylinder, means to admit steam from the tube into the hollow of the piston, and means to exhaust the steam from the piston and return the same to said chamber, said means including ports in the walls of the cylinder and the piston which register at intervals during the reciprocation of the piston.

2. The combination of a steam engine cylinder having a head provided with a steam space, a tube projecting inwardly from said head and connecting with said space, a hollow piston in the cylinder, and means to produce a flow of steam from said tube, through the piston, and back to said space, said means including ports in the walls of the cylinder and piston which register at times during the movement of the piston.

3. The combination of a steam engine cylinder having a head provided with a steam space, a tube projecting inwardly from said head and communicating with said space, a hollow piston in the cylinder, means to produce a flow of steam from said tube and through the interior of the piston, and means to return steam from said piston to the said steam space.

4. The combination of a steam engine cylinder and steam chest, a hollow piston in the cylinder, means dependent upon the reciprocation of the piston to supply steam thereto from the said chest and to compress same above the normal pressure thereof, and means to return said compressed steam from the piston to said steam chest, the means to supply steam to the piston from the steam chest including a tube projecting inwardly from the cylinder head and with which the piston communicates.

5. The combination of a steam engine cylinder having a hollow head forming a steam space, a tube projecting inwardly from said head and communicating with said space, a hollow piston having a tubular part which telescopes said tube and a port leading from said tubular part into the interior of the piston, and a check valve in said tube, the cylinder having a valved return passage leading to the steam space in the head, and the piston having a port which registers with said passage at intervals.

6. The combination of a steam engine cylinder and steam chest, a hollow piston in the cylinder, means dependent upon the reciprocation of the piston to supply steam thereto from the said chest and to compress same above the normal pressure thereof, and means to return said compressed steam from the piston to said steam chest.

In testimony whereof, I affix my signature in presence of two witnesses.

ALLAN D. SKINNER.

Witnesses:
 ALBERT E. ROSE,
 H. E. COBURN.